United States Patent
Chen et al.

(10) Patent No.: US 9,869,894 B2
(45) Date of Patent: Jan. 16, 2018

(54) EMBEDDED TOUCH DISPLAY PANEL AND TOUCH DISPLAY DEVICE

(71) Applicant: Shanghai Tianma Micro-Electronics Co., Ltd., Shanghai (CN)

(72) Inventors: Hao Chen, Shanghai (CN); Huiping Chai, Shanghai (CN); Jun Ma, Shanghai (CN); Zhifu Li, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 650 days.

(21) Appl. No.: 13/905,035

(22) Filed: May 29, 2013

(65) Prior Publication Data

US 2014/0184938 A1    Jul. 3, 2014

(30) Foreign Application Priority Data

Dec. 31, 2012  (CN) .......................... 2012 1 0592476

(51) Int. Cl.
- *G02F 1/1335* (2006.01)
- *G02F 1/1333* (2006.01)
- *G06F 3/041* (2006.01)
- *G06F 3/044* (2006.01)

(52) U.S. Cl.
CPC ........ *G02F 1/13338* (2013.01); *G06F 3/0412* (2013.01); *G02F 1/133514* (2013.01); *G06F 3/044* (2013.01); *G06F 2203/04111* (2013.01)

(58) Field of Classification Search
CPC combination set(s) only.
See application file for complete search history.

(56) References Cited

U.S. PATENT DOCUMENTS

| | | | |
|---|---|---|---|
| 2009/0225017 A1* | 9/2009 | Kim | G02F 1/133514 345/88 |
| 2011/0242444 A1 | 10/2011 | Song | |
| 2012/0033168 A1 | 2/2012 | Hwang et al. | |
| 2012/0249436 A1 | 10/2012 | Choi et al. | |
| 2014/0061597 A1* | 3/2014 | Choi | H01L 51/5284 257/40 |
| 2014/0070350 A1* | 3/2014 | Kim | G06F 1/169 257/432 |

(Continued)

FOREIGN PATENT DOCUMENTS

CN    202600304 U    12/2012

*Primary Examiner* — Jessica M Merlin
*Assistant Examiner* — Mark Teets
(74) *Attorney, Agent, or Firm* — Alston & Bird LLP

(57) ABSTRACT

A touch display panel comprises a color film substrate, which comprises a conducting layer arranged on a transparent substrate. The conducting layer comprises a plurality of first and second wires, and a color resistance insulating layer lying flat on the conducting layer, where the color resistance insulating layer includes first color resistances with via holes and second color resistances without via holes. The color film substrate also includes a plurality of bridges formed on the color resistance insulating layer, where at least one second color resistance has an extension portion extending in a direction substantially perpendicular to the second color resistances, where the extension portion isolates the conducting layer from the bridges between adjacent second color resistances.

20 Claims, 10 Drawing Sheets

(56) References Cited

U.S. PATENT DOCUMENTS

2014/0184945 A1\* 7/2014 Zhou ................... G02F 1/13338
   349/12
2014/0198268 A1\* 7/2014 Sugita ..................... G06F 3/044
   349/12

\* cited by examiner

EMBEDDED TOUCH DISPLAY PANEL AND TOUCH DISPLAY DEVICE

CROSS-REFERENCES TO RELATED APPLICATIONS

This application claims priority to Chinese patent application No. 201210592476.X titled "EMBEDDED TOUCH DISPLAY PANEL AND TOUCH DISPLAY DEVICE," and filed with State Intellectual Property Office of PRC on Dec. 31, 2012, which is incorporated herein by reference in its entirety.

BACKGROUND OF THE INVENTION

The present invention relates to touch screens, and in particular to an embedded touch display panel and a touch display device.

DESCRIPTION OF THE RELATED ART

An embedded touch display panel comprises a color film substrate and a TFT array substrate. In addition, a touch structural layer with touch function is generally arranged on the color film substrate. The general arrangement sequence of the color film substrate is: upper transparent substrate, black matrix BM, metal layer 1, insulating layer, metal layer 2, color resistance insulating layer, support component PS (Photo Spacer) and TFT array substrate. Alternatively, the sequence may be: upper transparent substrate, black matrix BM, color resistance insulating layer, metal layer 1, insulating layer, metal layer 2, support component PS (Photo Spacer) and TFT array substrate, wherein the metal layer 1 comprises detecting lines and driving lines, which are arranged in a crossing pattern, and the detecting lines or driving lines are not electrically connected in transverse direction. The color resistance insulating layer comprises a plurality of color resistances corresponding to sub-pixels of sub R/G/B, and some of the color resistances are arranged with via holes for electrically connecting the metal layer 1 and the metal layer 2. The metal layer 2 is a bridge layer, and one or more segments of bridges are connected with a detecting line or a driving line of the metal layer 1 through the via holes on the color resistances of the color resistance insulating layer.

The color film substrate comprises at least seven parts: upper transparent substrate, black matrix BM, metal layer 1, insulating layer, metal layer 2, the color resistance insulating layer and the support component, therefore the design and manufacture are relatively complex for the existing structure, and the production cost is relatively high.

BRIEF SUMMARY OF THE INVENTION

One inventive aspect is a touch display panel, including a color film substrate. The color film substrate includes a conducting layer arranged on a transparent substrate, where the conducting layer includes a plurality of first conducting wires and a plurality of second conducting wires. Each of the first conducting wires is divided into at least two segments by the plurality of second conducting wires. The color film substrate also includes a color resistance insulating layer on the conducting layer, where the color resistance insulating layer includes a plurality of first color resistances and a plurality of second color resistances arranged in parallel. The first color resistances have via holes, and the second color resistances do not have via holes. The color film substrate also includes a plurality of bridges formed on the color resistance insulating layer, each bridge connecting at least two segments of one of the first conducting wires together through the via holes. At least one of the second color resistances has an extension portion extending in a direction substantially perpendicular to the second color resistances, and the extension portion isolates the conducting layer from the bridges.

Another inventive aspect is a touch display device, including a touch display panel including a color film substrate. The color film substrate includes a conducting layer arranged on a transparent substrate, where the conducting layer includes a plurality of first conducting wires and a plurality of second conducting wires. Each of the first conducting wires is divided into at least two segments by the plurality of second conducting wires. The color film substrate also includes a color resistance insulating layer on the conducting layer, where the color resistance insulating layer includes a plurality of first color resistances and a plurality of second color resistances arranged in parallel. The first color resistances have via holes, and the second color resistances do not include via holes. The color film substrate also includes a plurality of bridges formed on the color resistance insulating layer, where each bridge connects at least two segments of one of the first conducting wires through the via holes. At least one of the second color resistances has an extension portion extending in a direction substantially perpendicular to the second color resistances, and the extension portion isolates the conducting layer from the bridges.

DETAILED DESCRIPTION OF THE INVENTION

Figure 1:
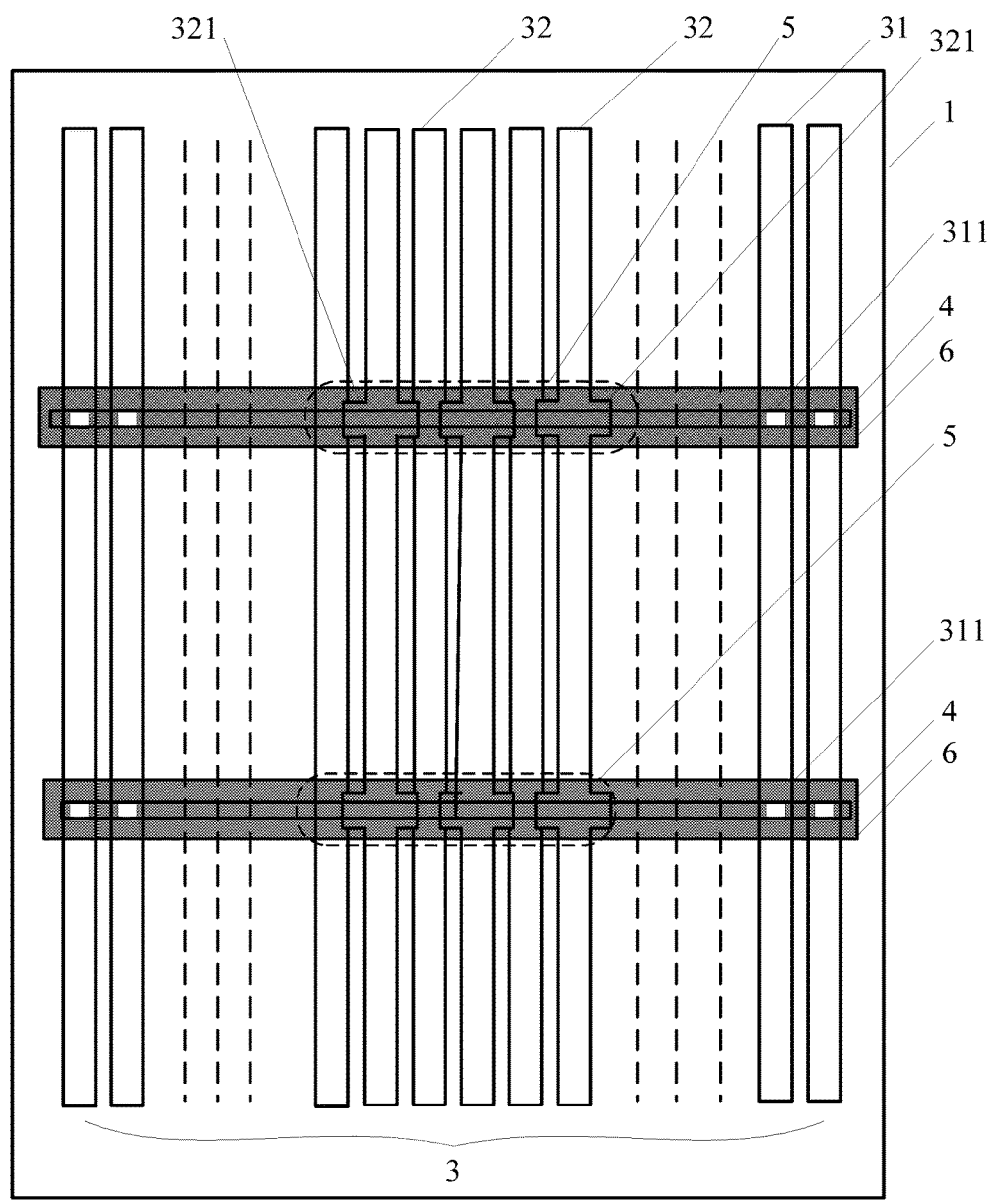
FIG. 1 is a structural schematic diagram of a color film substrate of a touch display panel of a first embodiment of the invention.

A first embodiment of the invention provides an embedded touch display panel, which comprises a color film substrate and a TFT array substrate arranged to be opposite to each other. A liquid crystal layer (not illustrated) is also arranged therebetween. FIG. 1 illustrates a schematic diagram of the color film substrate of the touch display panel (a conducting layer is not shown). The color film substrate comprises a conducting layer arranged on transparent substrate 1. The conducting layer comprises a plurality of first and second conducting wires crossing each other. Each of the first conducting wires is divided into at least two segments by the second conducting wires. A color resistance insulating layer 3 is on the conducting layer, and comprises a plurality of first color resistances 31 and a plurality of second color resistances 32 arranged in parallel. The first color resistances 31 are arranged with via holes 311; and bridges 4 connecting at least two segments of one of the first conducting wires together through the via holes 311.

At least one second color resistance 32 is provided with an extension portion 321, an extension direction of which is substantially perpendicular to the second color resistance 32. The extension portion 321 isolates the conducting layer from the bridges 4 between adjacent second color resistances 32.

Figure 2:
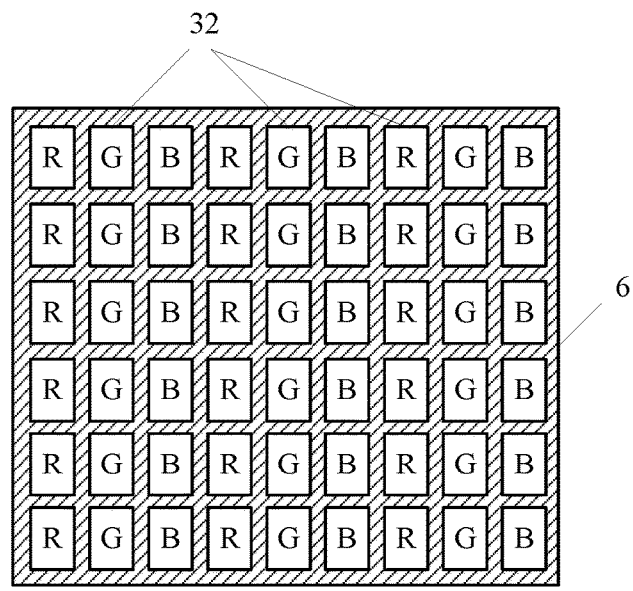
FIG. 2 is a partial top view of a black matrix and second color resistances of the first embodiment of the invention.

A black matrix 6 shields the bridges 4, gaps between adjacent first color resistances 31, and gaps between adjacent second color resistances 32. As shown in FIG. 2, which is a partial top view of the black matrix 6 and the second color resistances 32 on the color film substrate, the gaps of the second color resistances 32 are completely shielded by the black matrix 6 (only part of the black matrix 6 is shown in FIG. 1).

Figure 3:
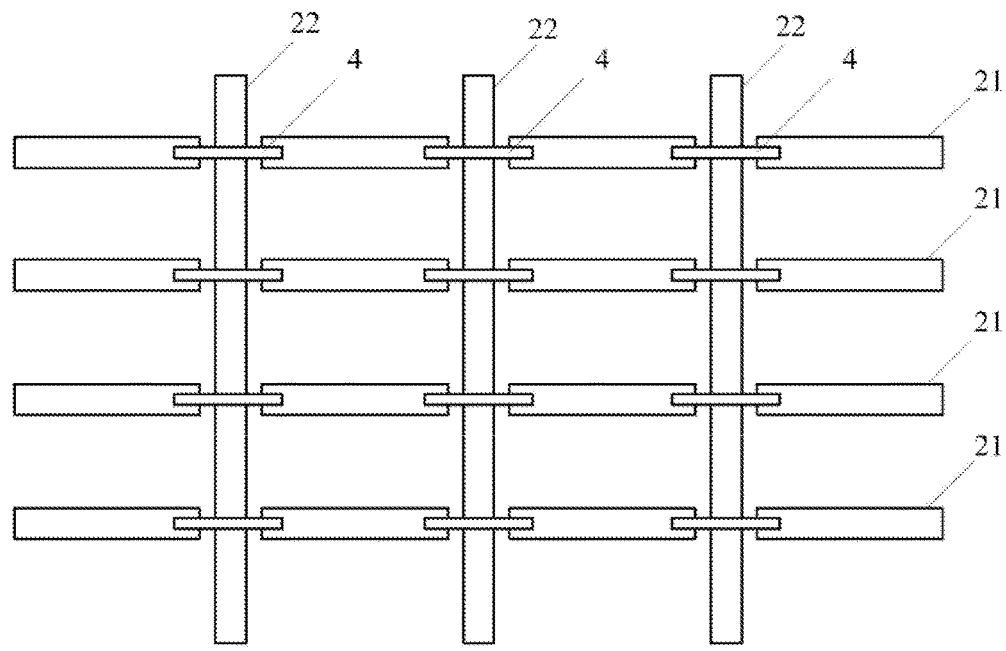
FIG. 3 is a schematic diagram of a conducting layer connecting bridges of the first embodiment of the invention.

FIG. 1 and FIG. 3 show a connection schematic diagram of the conducting layer and the bridges. the structure includes first conducting wires 21, second conducting wires 22, and the bridges 4. Each of the first conducting wires 21 is divided into at least two segments by the plurality of second conducting wires 22. In addition, the bridges 4 connect at least two segments of one first conducting wire 21 through the via holes 311 in the color resistance insulating layer 3 as shown in FIG. 1 (the color resistance insulating layer 3 and the via holes 311 are not shown in FIG. 3, and please refer to FIG. 1). Furthermore, the conducting layer can be a transparent conducting layer or a grid metal conducting layer, which does not affect the implementation of the embodiment of the invention.

Figure 4:
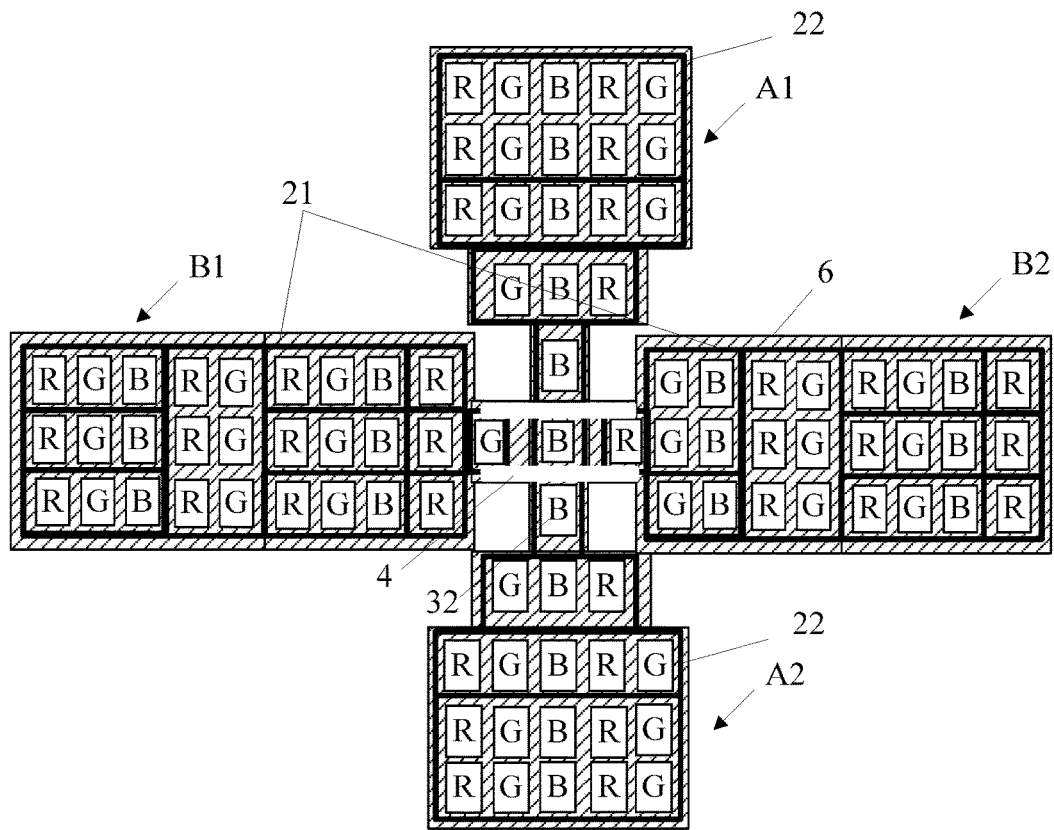
FIG. 4 is an enlarged schematic diagram of the bridges crossing with first conducting wires and second conducting wires of the conducting layer of the first embodiment of the invention.
Figure 5:
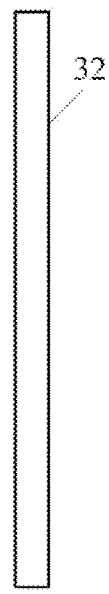
FIGS. 5 to 9 are structural schematic diagrams of color resistances of a second embodiment of the invention.

FIG. 4 shows an enlarged schematic diagram of a bridge 4 connecting the first conducting wires 21 and crossing second conducting wires 22 of the conducting layer in FIG. 3. Description is made herein with the conducting layer being a grid metal conducting layer as an example. The conducting layer includes black matrix 6 (filled with oblique lines), the second color resistances 32 (take RGB as an example, but not limited to this), the first conducting wires 21, where the first conducting wires 21 comprise two black portions, B1 and B2, which are segments of the disconnected first conducting wires 21 and are connected by the bridges 4. The conducting layer also includes second conducting wires 22, having two black portions, A1 and A2, as shown in FIG. 4. The two black portions A1 and A2 are connected segments of the second conducting wires 22. Both of the first conducting wires 21 and the second conducting wires 22 are grid structures and shielded by the black matrix 6. The bridge 4 between B1 and B2, as shown in FIG. 4, crosses three columns of color resistances, but the invention is not limited to this. For example, the bridge can cross more columns of color resistances. in some embodiments, the conducting layer is transparent and is shielded by the black matrix 6 or is not shielded.

At least one second resistance 32 overlaps with a second color resistance 32 in the extension direction of the extension portion 321 at an area corresponding to the bridge 4 to form an overlapping area 5. The minimal width of the extension portion 321, in the direction substantially perpendicular to the bridge 4, is wider than the bridge 4.

In the embodiment of the invention shown, the color resistance insulating layer is arranged between the conducting layer and the bridges, so the color resistance insulating layer insulates the conducting layer from the bridges. As a result, the complexity of the production design and the production cost are reduced. Moreover, at least one color resistance is provided with an extension portion substantially perpendicular to the second color resistance, and the extension portion isolates the conducting layer from the bridges at the bridges between adjacent color resistances, so that the bridges will not contact detecting lines or driving lines at the gaps between the color resistances which are not arranged with the via holes, thus avoiding touch inefficiency. In addition, if a color resistance is arranged in an offset position, the problem of color mixture does not occur.

However, when the support component of the touch display device is placed, the phenomenon of unevenness of the overlapping area may occur due to overlapping between the color resistances. Therefore, a second embodiment of the invention provides an embedded touch display panel, where at least one second color resistance is provided with an opening portion at an area corresponding to the bridges. In some embodiments, at least one second color resistance is provided with an extension portion and an opening portion at an area corresponding to the bridges.

In this case, the overlapping area at least forms a flat area covering the conducting layer between the adjacent second color resistances, and the flat area is applied to place the support component, and the arrangement modes of the second color resistances includes the following modes:

First mode, both sides of a second color resistance is provided with extension portions, and the extension portions of adjacent second color resistances overlap each other.

Second mode, the second color resistance is provided with an extension portion and an opening portion, the extension directions of the extension portions of a plurality of second color resistances are the same, and the extension portion of the front second color resistance cover the opening portion of the following second color resistance.

Third mode, a side of at least one second color resistance is provided with an extension portion, and the extension portion covers the opening portion of at least one second color resistance in the extension direction;

Fourth mode, a side of at least two second color resistances are each provided with an extension portion, and extension directions of the extension portions of the at least two second color resistances are opposite to each other. The extension portions thereof respectively cover the opening portion of at least one second color resistance therebetween; and Fifth mode, both sides of at least two second color resistances are each provided with extension portions, and the extension portions thereof respectively cover the opening portion of at least one second color resistance therebetween.

The maximal width of the opening portion in the direction substantially perpendicular to the bridge is narrower than the minimal width of the extension portion in the direction substantially perpendicular to the bridge.

In the third embodiment of the invention, FIGS. 5 to 9 show structural schematic diagrams of the second color resistances 32.

Figure 6:
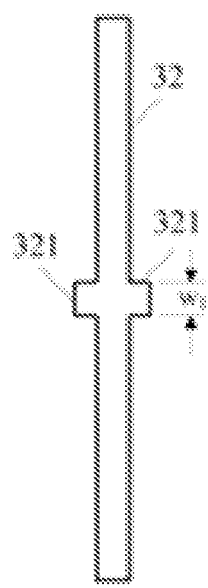

In FIG. 6, two extension portions 321 respectively extend outward from both sides of the second color resistance 32 at the bridge area. The minimal width of the extension portions 321 in the direction substantially perpendicular to the bridge is W1, and this width of W1 is wider than the bridges 4 indicated in FIG. 1 of the first embodiment of the invention.

Figure 7:
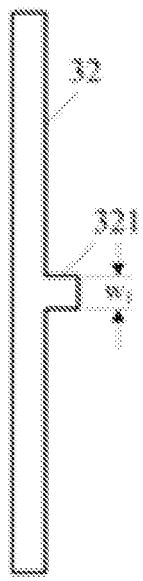

In FIG. 7, an extension portion 321 extends outward from one side of the second color resistance 32 at the bridge area, and the minimal width of the extension portion 321 in the direction of substantially perpendicular to the bridge is W1, and this W1 is wider than the bridges 4 indicated in FIG. 1 of the first embodiment of the invention. As shown in FIG.

7, the extension portion 321 can extend toward the left side of the second color resistance 32, and can also extend outward the right side, and a particular extension direction is depended on the combination of a plurality of second color resistances 32.

Figure 8:
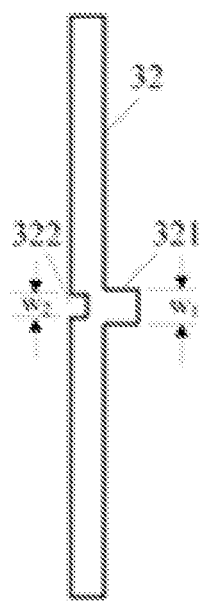

In FIG. 8, at the bridge area, an extension portion 321 extends outward from one side of the second color resistance 32, and an opening portion 322 extends inward from one side of the second color resistance 32. The minimal width of the extension portion 321 in the direction of substantially perpendicular to the bridge is W1, and the maximal width of the opening portion 322 in the direction of substantially perpendicular to the bridge is W2, wherein W1 is wider than the bridges 4 indicated in FIG. 1 of the first embodiment of the invention, and W2 is narrower than W1, so that the extension portion 321 of another second color resistance 32 can cover the opening portion 322 of the second color resistance 32 shown in FIG. 8 in the direction substantially perpendicular to the bridge.

Figure 9:
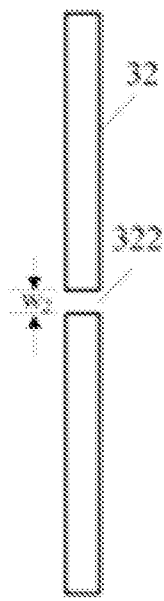

The second color resistance 32 shown in FIG. 9 is provided with an opening portion 322, and the opening portion 322 separates the second color resistance 32. The maximal width of the opening portion 322 in the direction of substantially perpendicular to the bridge is W2, wherein W2 is narrower than the above W1, so that the extension portion 321 of another second color resistance 32 can cover the opening portion 322 of the second color resistance 32 shown in FIG. 9 in the direction of substantially perpendicular to the bridge.

The second color resistances 32 shown in FIGS. 6 to 9, the geometry of the extension portion 321 or the opening portion 322 thereof can be characterized as substantially rectangular. In other embodiments, other geometries, such as a trapezoid, polygon or circle and the like, or irregular geometries can be used. Regardless of geometry, the minimal width W1 of the geometry in the direction of substantially perpendicular to the bridge may be wider than the bridge, or the geometry can be matched with the adjacent second color resistance 32 to form an overlapping area and the overlapping area can shield the bridge. The maximal width in the direction substantially perpendicular to the bridge may further meet the requirement of being narrower than a shielding strip of the corresponding black matrix, so that the overlapping area formed by a plurality of second color resistances 32 at the area corresponding to the bridge can be completely shielded by the black matrix.

In addition, for the second color resistances 32 shown in FIGS. 6 to 8, the length of the extension portion 321 thereof (the length refers to the extension length in the direction of parallel to the bridge) can be adjusted according to practical design requirements. For example, the length may be suitable for overlapping the adjacent second color resistance 32, or the length may be suitable for overlapping a plurality of second color resistances 32 in the extension direction of the extension portion 321. The structural schematic diagram thereof is similar to FIGS. 5 to 8 and thus is not shown repeatedly herein.

Figure 10:
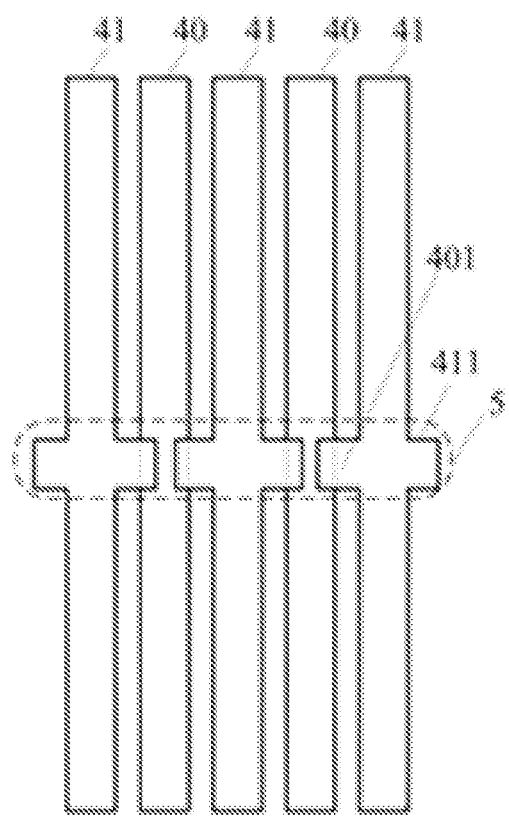
FIGS. 10 to 16 are schematic diagrams of combinational arrangements of color resistances of a third embodiment of the invention.

In the third embodiment of the invention, preferred arrangements of color resistance are described according to the structural schematic diagrams of the second color resistances shown in FIGS. 5 to 9 in the second embodiment. As shown in FIG. 10, there are a plurality of second color resistances 40 and a plurality of second color resistances 41, where the second color resistances 40 are the same as the second color resistance shown in FIG. 5 of the second embodiment, and the second color resistances 41 are the same as the second color resistance shown in FIG. 6 of the second embodiment. As shown, the second color resistances 40 and the second color resistances 41 are arranged alternately. The two extension portions 411 of one second color resistance 41 overlap with the adjacent second color resistances 40, wherein dotted lines 401 indicate the covered portions when the second color resistances 40 overlap the extension portions 411 of the second color resistances 41. As a result, the second color resistances 40 and the second color resistances 41 form an overlapping area 5 only at the area corresponding to the bridge (the bridge is not shown). In the overlapping area 5, the bridge does not contact the first metal wires or the second metal wires in the conducting layer.

Figure 11:
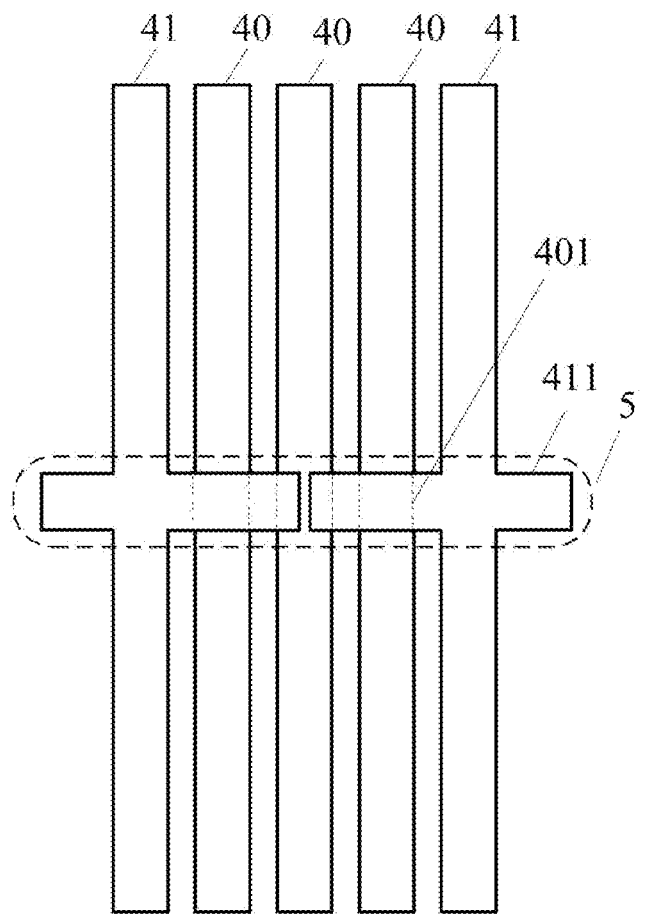

Based on the arrangement in FIG. 10, the variation as shown in FIG. 11 can be made. A plurality of second color resistances 40 are arranged between two second color resistances 41, and the extension portion 411 of one second color resistance 41 is long enough to overlap with a plurality of second color resistances 40. The dotted lines 401 indicate the covered portions when the second color resistances 40 overlap the extension portions 411 of the second color resistances 41. An overlapping area 5 is formed, and in the overlapping area 5, the bridge does not contact the first metal wires or the second metal wires in the conducting layer.

Figure 12:
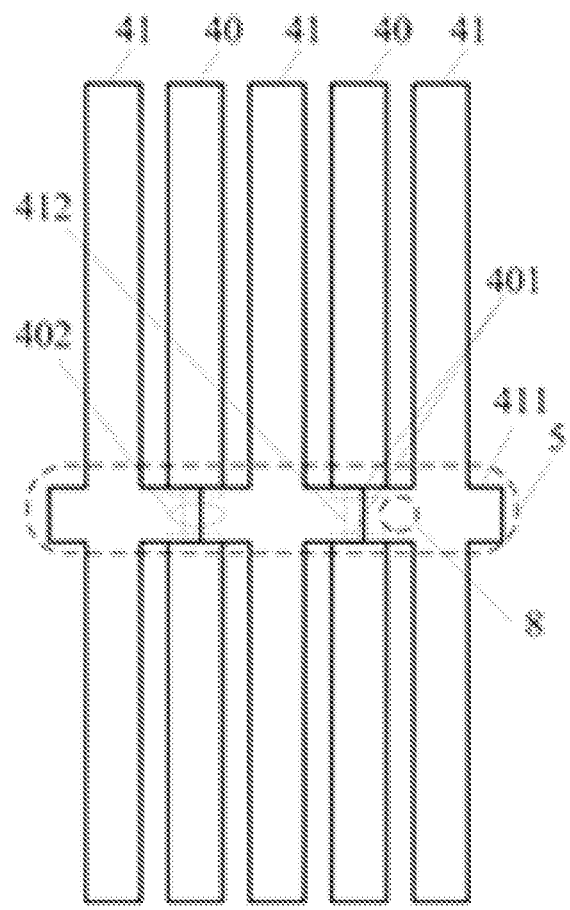

To make the overlapping area 5 relatively flat in a desired position, such as the position for placing the support component of the display panel, which is at gaps between the second color resistances, the second color resistances 40 in FIG. 10 or 11 can be the same as the second color resistance 32 shown in FIG. 9. As shown in FIG. 12, a plurality of second color resistances 40 and a plurality of second color resistances 41 are arranged alternatively. The extension portions 411 of one second color resistance 41 overlap the opening portions 402 of adjacent second color resistances 40, wherein dotted lines indicate the covered portions when the opening portions 402 of the second color resistances 40 overlap the extension portions 411 of the second color resistances 41. As a result, the second color resistances 40 and second color resistances 41, form an overlapping area 5 only at the area corresponding to the bridge (the bridge is not shown). In the overlapping area 5, the bridge does not contact the first metal wires or the second metal wires in the conducting layer. And further, the overlapping area 5 has a relatively flat area 8, thus it will not affect the placement of the support component of the display panel.

Based on the arrangement in FIG. 10, the variation as shown in FIG. 12 can also be made. Second color resistances 40 and second color resistances 41 are arranged alternatively. Extension portions 411 of two second color resistances 41 cover the opening portion 402 of the second color resistance 40 therebetween, and the extension portions 411 thereof overlap each other. Dotted lines 401 indicate the covered portions when the second color resistances 40 overlap the extension portions 411 of the second color resistances 41, and dotted lines 412 indicate the covered portions when the extension portions 411 of two second color resistances 41 overlap each other. An overlapping area 5 is formed, and in the overlapping area 5, the bridge does not contact the first metal wires or the second metal wires in the conducting layer. Further, the overlapping area 5 has a relatively flat area 8, and thus it will not affect the placement of the support component of the display panel.

Figure 13:
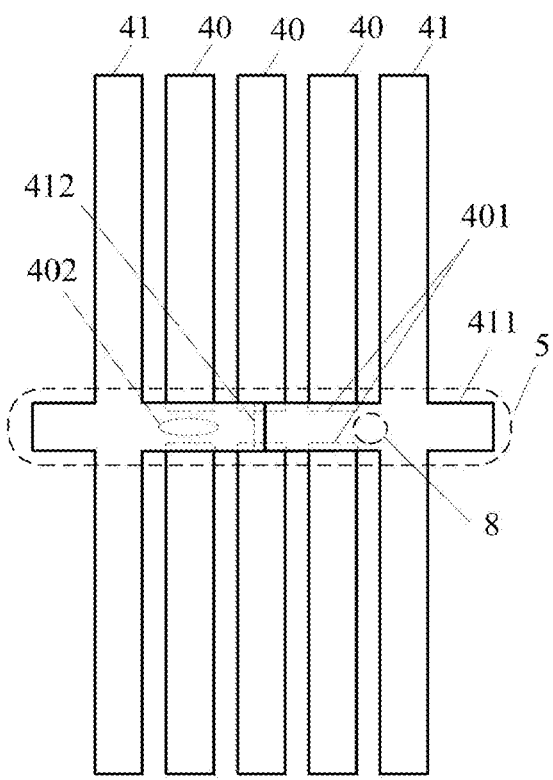

As shown in FIG. 13, a plurality of second color resistances 40 are arranged between two second color resistances 41. The extension portion 411 of one second color resistance 41 is long enough to overlap a plurality of second color resistances 40, and the extension portions 411 of two second color resistances 41 overlap each other. Dotted lines 401 indicate the covered portions when the opening portions 402 of the second color resistances 40 overlap the extension portions 411 of the second color resistances 41, and dotted lines 412 indicate the overlapping between the extension portions 411 of two second color resistances 41. An overlapping area 5 is formed, and in the overlapping area 5, the bridge does not contact the first metal wires or the second metal wires in the conducting layer. In addition, the overlapping area 5 has a relatively flat area 8, and thus it will not affect the placement of the support component of the display panel.

Figure 14:
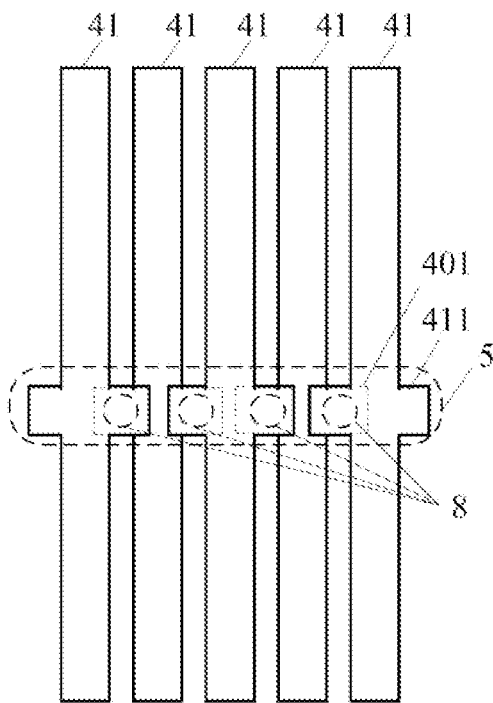

Another combination is as shown in FIG. 14, in which the second color resistances 41 are the same as the second color resistance 32 shown in FIG. 6. The second color resistances 41 are provided with extension portions 411 which respectively extend outward from both sides of the second color resistances 41. As shown, the extension portions 411 of adjacent second color resistances overlap each other to form an overlapping area 5. In the overlapping area 5, the bridge does not contact the first metal wires or the second metal wires in the conducting layer. The dotted lines 401 in FIG. 14 indicate the covered portions where the extension portions 411 overlap each other. As shown, both of the extension portions of one second color resistance 41 extend such that the overlapping area 5 has a relatively flat area 8, and thus it will not affect the placement of the support component of the display panel.

Figure 15:
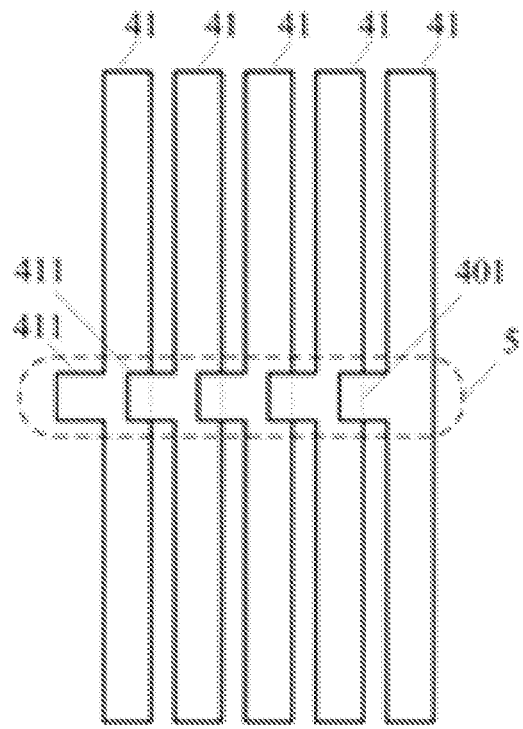

Another combination is as shown in FIG. 15, in which the second color resistances 41 are the same as the second color resistance 32 shown in FIG. 7. The extension directions of the extension portions 411 of the second color resistances 41 are the same, and a plurality of second color resistances 41 overlap to form an overlapping area 5. In the overlapping area 5, the bridge does not contact the first metal wires or the second metal wires in the conducting layer. The dotted lines 401 in FIG. 15 indicate the covered portions when the extension portions 411 overlap each other.

Figure 16:
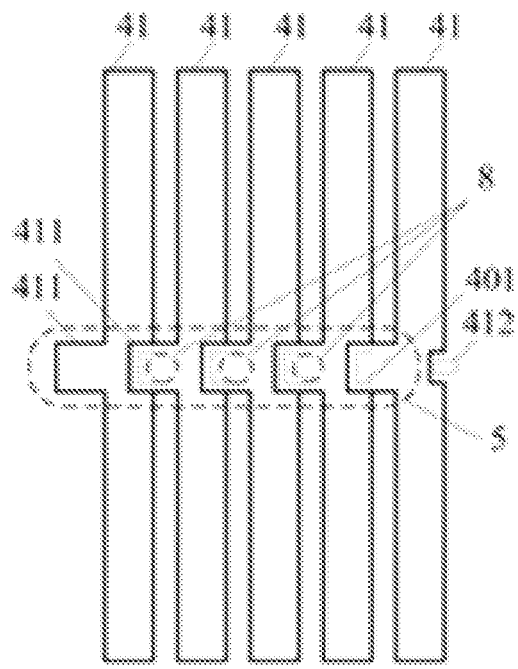

Based on the arrangement in FIG. 15, the variation as shown in FIG. 16 can be made, in which the second color resistances 41 are the same as the second color resistance 32 shown in FIG. 8. The extension directions of the extension portions 411 of the second color resistances 41 are the same, and each second color resistance 41 is provided with an opening portion 412. A plurality of second color resistances 41 overlap to form an overlapping area 5. In the overlapping area 5, the bridge does not contact the first metal wires or the second metal wires in the conducting layer. The dotted lines 401 in FIG. 16 indicate the covered portions when the extension portion 411 of one second color resistance 41 overlaps the opening portion 412 of another second color resistance 41. Further, the overlapping area 5 has a relatively flat area 8, and thus it will not affect the placement of the support component of the display panel.

An embodiment of the invention provides an embedded touch display device, comprising a display panel and the above-mentioned touch display panel, where the second color resistances, which are not arranged with the via holes, overlap each other to form overlapping areas only at areas corresponding to the bridges. The overlapping areas may be relatively flat at places corresponding to gaps of two adjacent color resistances and may be used to place the support component of the display panel.

Certain embodiments of the invention have the following beneficial effects: a plurality of color resistances, which are not arranged with the via holes, overlap each other to form overlapping areas only at areas corresponding to the bridges. The overlapping areas shield the gaps only at the areas corresponding to the bridges between two adjacent second color resistances so that the ridges will not contact detecting lines or driving lines at the gaps between the color resistances without the via holes. This avoids touch inefficiency, and at the same time, the overlapping areas are relatively flat at places corresponding to the gaps between two adjacent color resistances, thus avoiding adverse effects on the support component of the display panel if the support component is placed on an uneven overlapping area.

Those skilled in the art can make various modifications and variations to the embodiments without departing from the spirit and the scope of the invention. Thus, the invention is also intended to encompass these modifications and variations.

What is claimed is:

1. A touch display panel, comprising a color film substrate, wherein the color film substrate comprises:
   a conducting layer arranged on a transparent substrate, the conducting layer comprising a plurality of first conducting wires and a plurality of second conducting wires, wherein each of the first conducting wires is divided into at least two segments by the plurality of second conducting wires;
   a color resistance insulating layer on the conducting layer, the color resistance insulating layer comprising a plurality of first color resistances and a plurality of second color resistances arranged in parallel, wherein the first color resistances have via holes, and the second color resistances do not have via holes; and
   a plurality of bridges formed on the color resistance insulating layer, each bridge connecting at least two segments of one of the first conducting wires together through the via holes,
   wherein at least one of the plurality of second color resistances has a minor protrusion formed of a same insulating material as the second color resistances and extending in a direction substantially perpendicular to an extension direction of the length of the one second color resistance, wherein the minor protrusion is shorter in all dimensions than the length of the one second color resistance and wherein the minor protrusion isolates the conducting layer from the bridges.

2. The touch display panel according to claim 1, wherein the at least one of the second color resistances overlaps with the second color resistances in the extension direction of the minor protrusion at an area corresponding to the bridges to form an overlapping area; and the minimal width of the minor protrusion in the direction of substantially perpendicular to the direction of the bridges is wider than the width of the bridges.

3. The touch display panel according to claim 2, wherein at least one of the second color resistances is provided with an opening portion at the area corresponding to the bridges; or wherein at least one of the second color resistances is provided with the minor protrusion and an opening portion in the area corresponding to the bridges.

4. The touch display panel according to claim 2, wherein the minor protrusion of the at least one second color resistance extends in opposite directions from the at least one second color resistance, and wherein an adjacent second color resistance has a second minor protrusion contacting the minor protrusion of the at least one second color resistance.

5. The touch display panel according to claim 3, wherein when the at least one second color resistance has the opening portion, and wherein an adjacent second color resistance has a minor protrusion covering the opening portion of the at least one second color resistance.

6. The touch display panel according to claim 3, wherein a side of at least one of the second color resistances is provided with a minor protrusion, and the minor protrusion covers the opening portion of at least one of the second color resistances in the extension direction.

7. The touch display panel according to claim 3, wherein at least two of the second color resistances each have a minor protrusion, and the extension directions of the minor protrusions of the at least two second color resistances are opposite to each other, and wherein the minor protrusions of the at least two second color resistances respectively cover opening portions of at least one of the second color resistances.

8. The touch display panel according to claim 3, wherein at least two of the second color resistances each have minor protrusions which extend in opposite directions, and the minor protrusions of the at least two second color resistances respectively cover an opening portion of at least one of the second color resistances between the at least two second color resistances.

9. The touch display panel according to claim 3, wherein the maximal width of the opening portion in the direction of substantially perpendicular to the bridges is narrower than the minimal width of the minor protrusion in the direction of substantially perpendicular to the direction of the bridges.

10. The touch display panel according to claim 3, wherein the geometry of the minor protrusion or the opening portion is characterized as a regular geometry.

11. The touch display panel according to claim 3, wherein the geometry of the minor protrusion or the opening portion is characterized as a rectangle.

12. The touch display panel according to claim 3, wherein the geometry of the minor protrusion or the opening portion is characterized as an irregular geometry.

13. The touch display panel according to claim 2, wherein the touch display panel further comprises:
    a TFT array substrate arranged to be opposite to the color film substrate; and
    a support component arranged between the bridges and the TFT array substrate.

14. The touch display panel according to claim 13, wherein the overlapping area is flat and covers the conducting layer between adjacent second color resistances, and the overlapping area receives the support component.

15. The touch display panel according to claim 2, wherein the conducting layer is transparent or comprises a grid.

16. The touch display panel according to claim 15, wherein a black matrix is arranged between the transparent substrate and the conducting layer, and the overlapping area is shielded by the black matrix.

17. The touch display panel according to claim 16, wherein the bridges comprise metal, and are shielded by the black matrix.

18. The touch display panel according to claim 16, wherein the conducting layer comprises a grid, and is shielded by the black matrix.

19. The touch display panel according to claim 1, wherein the first conducting wires are driving lines, and the second conducting wires are detecting lines, or the first conducting wires are detecting lines, and the second conducting wires are driving lines.

20. A touch display device, comprising a touch display panel comprising a color film substrate, wherein the color film substrate comprises:
    a conducting layer arranged on a transparent substrate, the conducting layer comprising a plurality of first conducting wires and a plurality of second conducting wires, wherein each of the first conducting wires is divided into at least two segments by the plurality of second conducting wires;
    a color resistance insulating layer on the conducting layer, the color resistance insulating layer comprising a plurality of first color resistances and a plurality of second color resistances arranged in parallel, wherein the first color resistances have via holes, and the second color resistances do not comprise via holes; and
    a plurality of bridges formed on the color resistance insulating layer, each bridge connecting at least two segments of one of the first conducting wires through the via holes, wherein at least one of the second color resistances has a minor protrusion formed of a same insulating material as the second color resistances and extending in a direction substantially perpendicular to an extension direction of the length of the one second color resistance, wherein the minor protrusion is shorter in all dimensions than the length of the one second color resistance and wherein the minor protrusion isolates the conducting layer from the bridges.

* * * * *